UNITED STATES PATENT OFFICE.

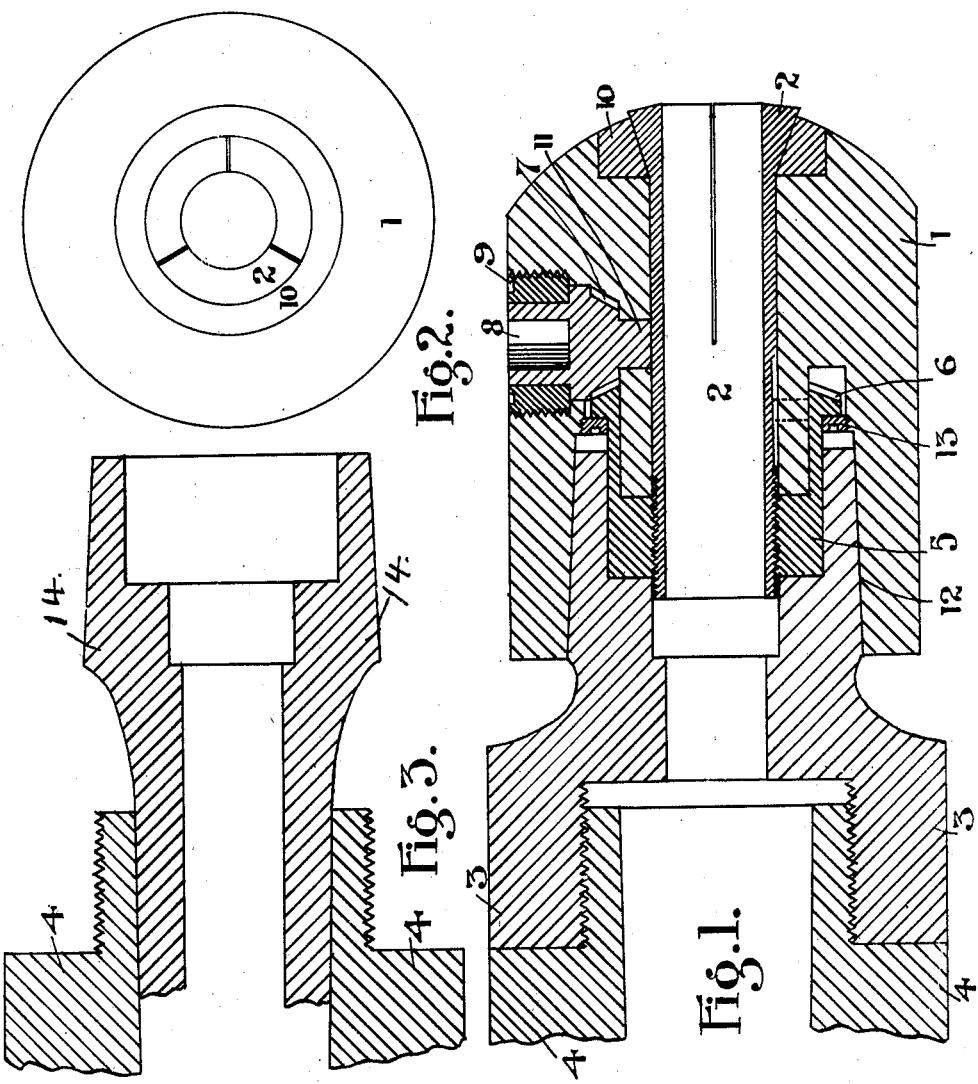

FRED RAHM, OF LOUISVILLE, KENTUCKY.

CHUCK.

No. 896,663.         Specification of Letters Patent.         Patented Aug. 18, 1908.

Application filed September 23, 1905. Serial No. 279,776.

*To all whom it may concern:*

Be it known that I, FRED RAHM, a citizen of the United States, residing at Louisville, in the county of Jefferson and State of Kentucky, have invented a new and useful Chuck, of which the following is a specification.

This invention relates to chucks for engine lathes, and the objects of my improvement are, precision, comparative inexpensiveness of manufacture, facility of use, ease and quickness of manipulation, and durability. These objects I attain by means of the mechanism illustrated in the accompanying drawings, in which—

Figure 1 is a vertical sectional view; Fig. 2 is a front end view; and Fig. 3, a longitudinal elevation of a modification of the tapered attachment-piece.

1 represents the body of the chuck; 2 is a common split-chuck bushing; 3 is the attachment-piece for attaching to the lathe spindle; 4 is the lathe spindle; 5 is a nut for tightening the split bushing 2; 6 is an integral bevel gear on nut 5; 7 is a bevel pinion meshing with gear 6; 8 is a socket for a wrench, integral with and for the purpose of turning pinion 7; 9 is a bushing screwed into body 1 to hold pinion 7 in place and form a bearing therefor; 10 is a hardened stationary bushing secured in the outer end of body 1; 11 represents the inner bearing-pintle of pinion 7; 13 is a collar screwed into body 1 adapted to hold gear 6 and nut 5 in place; and, 14 is a modification of the attachment-piece.

The attachment-pieces 3 and 14 are externally tapered at 12, and the body 1 of the chuck is internally tapered correspondingly to fit pieces 3 and 14 so that the body 1 may be removed from pieces 3 and 14 and applied thereto so as to fit accurately and run true. Body 1 is axially bored to receive the split-chuck bushing 2 accurately. In the outer end of body 1 is let in a piece, 10, preferably of hardened tool steel, bored with a tapered hole and ground true so as to fit the tapered portion of bushing 2. The back of body 1 is bored out to accommodate the attachment-pieces and the nut 5. When body 1 is removed from attachment-piece 3 or 14, nut 5 may be inserted or removed. Nut 5 is adapted to screw on the threaded portion of bushing 2 and is connected with an annular integral bevel-gear, 6. Behind said bevel-gear portion is a shoulder, and body 1 is internally threaded to receive an annular lock-nut, 13, provided with holes for receiving a wrench, and adapted to screw into body 1 behind gear 6 and thus prevent gear 6 and nut 5 from displacement or dropping out of the body.

In the side of body 1 is provided an opening which is of such size and form at its bottom as to accommodate and form a bearing for pintle 11, which is integal with bevel pinion 7, the outer portion of said opening being threaded to receive a bushing, 9, provided with means for applying a wrench and setting it down tight upon the bottom of the counter-bore so that its lower end bears on a shoulder on bevel pinion 7, and also to provide an external bearing for said pinion. Pinion 7 is provided at its outer end with a square or hexagon socket, 8, adapted to receive a wrench for opening and closing the chuck.

The attachment-piece 3 may be internally threaded, as shown in Fig. 1, adapting it to screw on the working end of the lathe-spindle, or the modification 14 may be used, formed with a taper shank (Fig. 3) adapted to fit the taper hole in the lathe spindle.

The operation of this chuck will now be obvious. A split bushing 2 is selected, slightly larger than the stock to be clamped therein, the stock is inserted, the wrench is applied to socket 8, and nut 5 screwed up thereby, thus drawing in bushing 2 and firmly securing the piece to be held. If the chuck is to be used in a shop having lathes of different sizes, attachment-pieces 3 and 14 may be provided to fit each lathe, the taper portion 12 of all the attachment-pieces being the same, and attachment-pieces may also be provided for the drill presses. The chuck may then be easily applied to any of these machines and stock or tools held with precision.

Having thus described my invention so that any one skilled in the art pertaining thereto may make and use it, I claim—

A lathe chuck comprising a body portion provided with an axial chamber placed at its front end, a socket in its rear end, a chambered attachment-piece adapted to fit the socket of said body portion and to be secured to the spindle of a lathe or drill-press, a split-chuck bushing fitting the axial chamber of said body portion and having an external thread on its rear portion, a nut mounted in the rear part of said body portion so disposed and arranged as to engage the threaded portion at the rear end of the shank of said split-chuck bushing and having gear teeth thereon concentrically disposed, and a pinion meshing with said gear wheel, substantially as specified.

FRED RAHM.

Witnesses:
J. H. MARTIN COOKE,
J. S. BORDEN.